US009514451B2

(12) United States Patent
Li

(10) Patent No.: US 9,514,451 B2
(45) Date of Patent: Dec. 6, 2016

(54) METHOD, APPARATUS AND SYSTEM FOR INFORMATION IDENTIFICATION

(71) Applicant: TENCENT TECHNOLOGY (SHENZHEN) COMPANY LIMITED, Shenzhen (CN)

(72) Inventor: Maocai Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 155 days.

(21) Appl. No.: 14/451,234

(22) Filed: Aug. 4, 2014

(65) Prior Publication Data

US 2015/0117781 A1 Apr. 30, 2015

Related U.S. Application Data

(63) Continuation of application No. PCT/CN2014/079492, filed on Jun. 9, 2014.

(30) Foreign Application Priority Data

Oct. 29, 2013 (CN) .......................... 2013 1 05216012

(51) Int. Cl.
*G06K 9/20* (2006.01)
*G06Q 20/20* (2012.01)
*G06Q 20/34* (2012.01)
*G06K 9/46* (2006.01)

(52) U.S. Cl.
CPC ........... *G06Q 20/204* (2013.01); *G06K 9/2054* (2013.01); *G06Q 20/351* (2013.01); *G06K 2009/4666* (2013.01); *G06K 2209/01* (2013.01)

(58) Field of Classification Search
None
See application file for complete search history.

(56) References Cited

U.S. PATENT DOCUMENTS 6,164,540 A * 12/2000 Bridgelall .......... G06K 7/10851
235/455
7,382,911 B1 * 6/2008 Meier ................ G06K 7/10851
382/139

(Continued)

FOREIGN PATENT DOCUMENTS

CN 101064600 A 10/2007
CN 101319874 A 12/2008

(Continued)

OTHER PUBLICATIONS

Taiwan Intellectual Property Office (TIPO) Office Action 1 for 103135417 Sep. 10, 2015.

(Continued)

*Primary Examiner* — Michelle Entezari
(74) *Attorney, Agent, or Firm* — Anova Law Group, PLLC

(57) ABSTRACT

Methods, apparatus, and systems for information identification are provided. A card image of a pre-set collection area is photographed and obtained, when a request event for information identification is detected. Edge-size information of the card image obtained by photographing is determined. A target area of the card image is marked according to the edge-size information. An image of the target area is extracted. Character shapes to be identified in the image of the target area is determined based on a pre-set character pattern library. A character corresponding to each character shape to be identified is identified according to each character shape to be identified that is determined and according to the character pattern library.

15 Claims, 9 Drawing Sheets

(56) References Cited

U.S. PATENT DOCUMENTS

| | | | | |
|---|---|---|---|---|
| 7,769,235 | B2* | 8/2010 | Anisimovich | G06K 9/6255 |
| | | | | 382/135 |
| 2003/0053694 | A1* | 3/2003 | Chamberlain | G06K 9/4604 |
| | | | | 382/190 |
| 2005/0087598 | A1* | 4/2005 | Yamanaka | G06Q 20/20 |
| | | | | 235/440 |
| 2006/0045322 | A1* | 3/2006 | Clarke | G06Q 20/042 |
| | | | | 382/137 |
| 2011/0305406 | A1 | 12/2011 | Huang | |
| 2013/0202185 | A1* | 8/2013 | Irwin, Jr. | G06K 9/18 |
| | | | | 382/137 |
| 2014/0112526 | A1* | 4/2014 | Kim | G06K 9/72 |
| | | | | 382/103 |

FOREIGN PATENT DOCUMENTS

| | | |
|---|---|---|
| CN | 101739441 A | 6/2010 |
| CN | 101751568 A | 6/2010 |
| CN | 102324044 A | 1/2012 |
| JP | S58195280 A | 11/1983 |
| TW | 200926013 A | 6/2009 |
| TW | 200931326 A | 7/2009 |

OTHER PUBLICATIONS

The World Intellectual Property Organization (WIPO) International Search Report for PCT/CN2014/079492 Sep. 24, 2014.

* cited by examiner

METHOD, APPARATUS AND SYSTEM FOR INFORMATION IDENTIFICATION

CROSS-REFERENCES TO RELATED APPLICATIONS

This application is a continuation application of PCT Patent Application No. PCT/CN2014/079492, filed on Jun. 9, 2014, which claims priority to Chinese Patent Application No. 2013105216012, filed on Oct. 29, 2013, the entire content of which is incorporated herein by reference.

FIELD OF THE DISCLOSURE

The present disclosure relates to the field of computer application technology and, more particularly, relates to methods, apparatus, and systems for information identification.

BACKGROUND

Currently, electronic document information may be delivered by computer network and communication network as well as other communication technologies including Bluetooth and infrared (IR) for short distances. In many cases, information may also be delivered by paper, cards, and other media for information recording. Electronic document information and the information recorded on paper and cards needs to be regularly transformed between one another. Conversion of the electronic document information into information recorded on paper and cards may only need a machine to print out onto paper and cards. Conversion of information recorded on paper and cards into the electronic document information may include a variety of manners.

A user may manually type the information recorded on paper and cards with applications including word, notepad, etc. However, such recording is time-consuming and labor-intensive, and in some cases may not be easily to achieve. For example, when performing a mobile phone transaction payment, the user is required to enter a long bank card number in a small screen, which is cumbersome and easy to generate errors. Conventional methods may use computers to automatically identify and extract information from images to obtain information recorded on paper and cards.

A conventional method may specifically include: obtaining images of media of paper and cards that are recorded with information thereon, and completing an automatic identification of the image content after processing, based on gray degree of pixel points, pixel characteristics of pixel points, and algorithm for separating image and background etc.

As such, conventional methods for automatically identify information and for extracting information are complicated, and are with high configuration requirements for terminal devices. In addition, in some cases, even when only a portion of the information is required (for example, only the bankcard number or a contact number is needed), the entire image needs to be analyzed and processed. This wastes resources of hardware and software of the terminal device.

BRIEF SUMMARY OF THE DISCLOSURE

One aspect or embodiment of the present disclosure includes a method for information identification. A card image by photographing of a collection area that is pre-set is obtained when a request event for an information identification is detected. Edge-size information of the card image obtained by photographing is determined. A target area of the card image is marked according to the edge-size information. An image of the target area is extracted. Character shapes to be identified in the image of the target area is determined based on a pre-set character pattern library. A character corresponding to each character shape to be identified is identified according to each character shape to be identified that is determined and according to the character pattern library.

Another aspect or embodiment of the present disclosure includes a method for information identification. A terminal obtains a card image by photographing of a collection area that is pre-set, and sends the card image obtained by photographing to a server, when a request event for an information identification is detected. The server determines edge-size information of the card image obtained by photographing when the server receives the card image, marks a target area of the card image according to the edge-size information, and extracts an image of the target area. The server determines character shapes to be identified in the image of the target area based on a pre-set character pattern library; and identifies a character corresponding to each character shape to be identified, according to each character shape to be identified that is determined and according to the character pattern library.

Another aspect or embodiment of the present disclosure includes an apparatus for information identification. The apparatus includes a collecting module, an extracting module, and an identifying module. The collecting module is configured to obtain a card image by photographing of a collection area that is pre-set, when a request event of an information identification is detected. The extracting module is configured to determine edge-size information of the card image obtained by photographing; to mark a target area of the card image according to the edge-size information; and to extract an image of the target area. The identifying module is configured to determine character shapes to be identified in the image of the target area based on a pre-set character pattern library; and to identify a character corresponding to each character shape to be identified according to each character shape to be identified that is determined and according to the character pattern library.

Another aspect or embodiment of the present disclosure includes an apparatus for information identification. The apparatus includes a receiving module, an extracting module, and an identifying module. The receiving module is configured to receive a card image obtained by photographing from a terminal. The extracting module is configured to determine edge-size information of the card image obtained by photographing and according to the edge-size information, to mark a target area of the card image; and to extract an image of the target area. The identifying module is configured to determine character shapes to be identified in the image of the target area based on a pre-set character pattern library; and according to each character shape to be identified that is determined and the character pattern library, to identify a character corresponding to each character shape to be identified.

Another aspect or embodiment of the present disclosure includes a system for information identification. The system includes a terminal and a server. The terminal is configured to obtain a card image by photographing from a collection area that is pre-set, and to send the card image obtained by photographing to the server when a request event for an information identification is detected. The server is configured, when the server receives the card image, to determine edge-size information of the card image obtained by photographing, and according to the edge-size information, to mark a target area of the card image, and to extract an image of the target area. The server is further configured to determine character shapes to be identified in the image of the target area based on a pre-set character pattern library; and according to each character shape to be identified that is determined and the character pattern library, to identify a character corresponding to each character shape to be identified.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
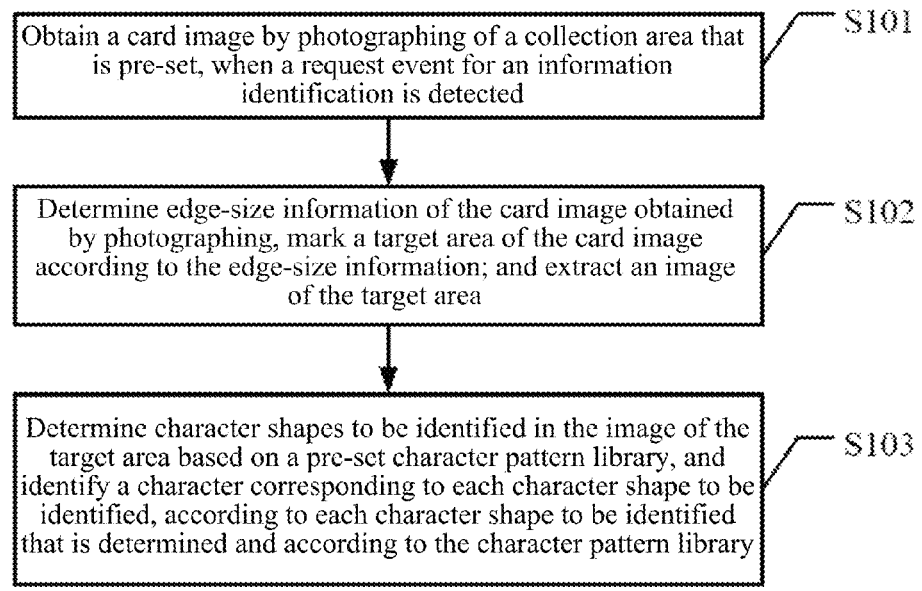
FIG. 1 depicts an exemplary method for information identification consistent with various disclosed embodiments.

FIG. 1 depicts an exemplary method for information identification consistent with various disclosed embodiments. The exemplary method can be implemented in various smart terminal devices.

In step S101, when a request event for an information identification is detected, a card image is obtained by photographing from a pre-set collection area.

After turning on a corresponding application function on a terminal, when the user starts an information identification request, for example, by clicking a corresponding photographing button of information identification, to perform the exemplary Step S101, the user can firstly call the photographing interface. After aligning the image to be photographed and pressing the photographing button, the card image can be obtained by photographing from a pre-set collection area.

The card image includes an image of a user bank card, an image of an ID (identification) card, an image of a business card, or images of other cards. These cards include the information that needs to be identified, such as the card number information by coating bank card number on the bank card, user ID number information printed by planography. The pre-set collection area corresponds to a photographing interface having the collection area pre-set with a designated shape and a designated edge-size. The photographing interface may include various forms, such as an interface of a rectangle collection area used for photographing a bank card or an ID card, or an interface for obtaining a circular collection area for photographing circular cards. Through the above photographing interface including the collection area, the terminal can only obtain the card image to be identified. This effectively reduces workload for subsequent identification process.

In Step S102, edge-size information of the card image obtained by photographing is determined. According to the edge-size information, a target area of the card image is marked. An image of the target area is extracted.

Figure 2:
FIG. 2 is a schematic illustrating a card with respect to a target area of the card consistent with various disclosed embodiments.

For example, the edge-size can simply be determined based on the number of pixel points. The target area actually is a relative area pre-set for this type of card, which is a pre-set identification area location. In an example for bank cards, the target area can be simply set in a location of the bank card as exemplarily shown in FIG. 2. Each side in a length direction (as opposed to a width direction) of the rectangular target area 260 is distanced from a corresponding side in a length direction of the bank card by, e.g., about ¼ to about ⅓,of a width of the bank card, while the two sides in a width direction of the rectangular target area can overlap with corresponding sides of the bank card, as shown in FIG. 2. Because the target area corresponds to the card image, e.g., the target area can be proportionally reduced or enlarged with respect to the area of the bank card, the disclosed method can be applied to any card with any dimensions.

Figure 3:
FIG. 3 is a schematic illustrating a specific target area of a card consistent with various disclosed embodiments.

In other embodiments, the actual and more accurate card dimension information can be obtained by measuring distances and angles to card edges combined with the geometry calculation models. Such card dimension information can be used as edge-size information of the card image as used for the Step S102 and be combined with the location of identification area which is pre-set for the bank card, to determine the target area based on the accurate size information as shown in FIG. 3. After the target area is determined, the image of the target area in the card image is obtained by collecting through the image editing tools. Because the relative location of target area in the card is configured by statistics based on a large amount cards in a same catalog (or same kinds) or by a user directly based on the card to be identified before implementing this method, the target area containing information of required numbers and/or words can be ensured to be obtained in Step S102.

In Step S103, character shapes to be identified in the image of the target area is determined based on a pre-set character pattern library. According to each character shape to be identified that is determined and according to the character pattern library, a character corresponding to each character shape to be identified is identified. The pre-set character pattern library includes features of character shapes of, e.g., Arabic digits/figures, texts (e.g., Chinese characters, alphabets, etc.), etc. According to the character pattern library, the character to be identified of each doubtful digit/figure or text in the target area can be obtained. Then, based on the shape of the character to be identified and combing with the font characteristic in the character pattern library, the specific content of the doubtful digit or text can be compared and identified to obtain a corresponding character.

In a specific embodiment, after the target area is obtained, the small images in the target area can be identified using existing identification technologies, so as to simply and rapidly obtain the character represented by the image of target area. After obtaining each character in the target area, the terminal can display to the user for the user to check and verify, or when the identified character has characteristics of the bank card, according to the payment application opened by the user, the identified character can be sent to the server corresponding to the payment application.

As disclosed, after photographing a card image from a collection area, a client can analyze the location of the card image to obtain an image of an area portion. Image identification based on the character shape can then be performed. In this manner, all kinds of cards (especially all kinds of bank cards) or information of ID cards needed by a user can be rapidly, effectively identified. Resources waste can be avoided.

Figure 5:
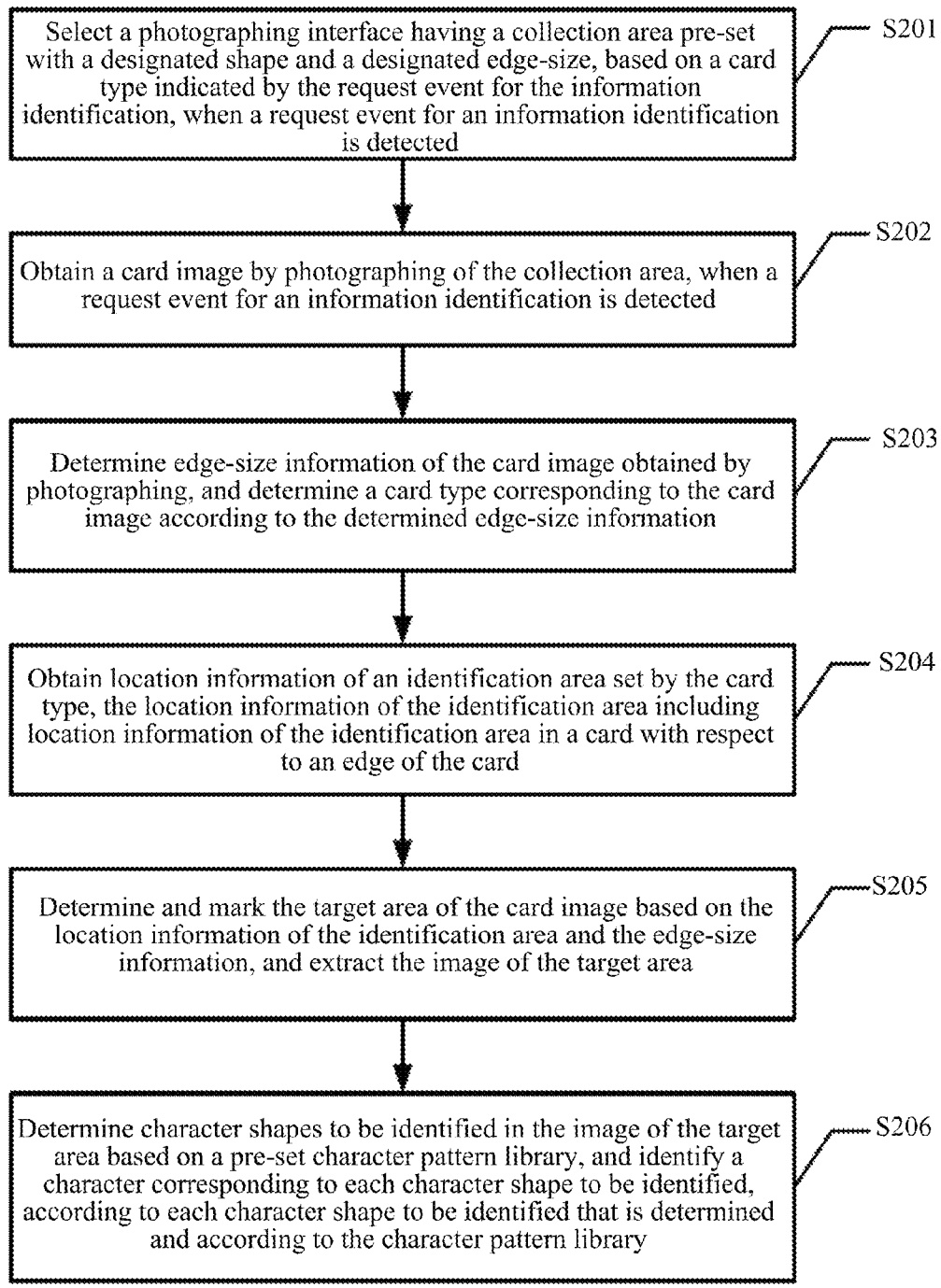
FIG. 5 depicts another exemplary method for information identification consistent with various disclosed embodiments.

FIG. 5 depicts another exemplary method for information identification consistent with various disclosed embodiments. The exemplary method can be performed by various smart terminals.

In Step S201, when a request event for an information identification is detected, a photographing interface having a collection area pre-set with a designated shape and a designated edge-size is selected based on a card type indicated by the request event for the information identification.

In one embodiment, after turning on a corresponding application, the user can designate a card type of a card to be identified. For example, a user can designate to identify a bank card or an ID card.

Figure 4:
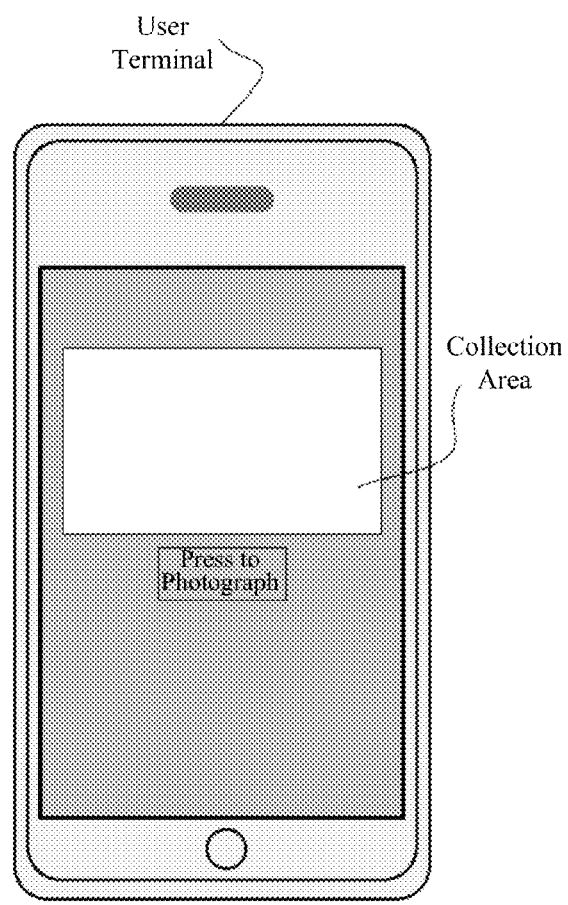
FIG. 4 depicts an exemplary photographing interface consistent with various disclosed embodiments.

For different card types, the collection area with different sizes and different shapes and the regarded photographing interface can be configured, in order to completely photograph to obtain a card image. In addition, based on different card types, different location information of identification area, used for determining the relative location of the target area needs to be identified in the card, can be configured. For example, FIG. 4 depicts an exemplary photographing interface consistent with various disclosed embodiments.

In Step S202, when a request event for photographing is detected, the card image of the collection area is obtained by photographing.

In one embodiment, after performing Step S201, photographing direction and photographing distance can be adjusted to facilitate subsequent extracting of the target area and determination of the characters from a positive and a negative direction. After selecting a suitable photographing direction and distance, a corresponding button can be pressed to initiate a photographing request. The terminal can then obtain the card image of the collection area by photographing through the camera in the system of the terminal. In various embodiments, photographing can include taking a picture or recording a video.

In Step S203, edge-size information of the card image obtained by photographing is determined. According to the determined edge-size information, a card type corresponding to the card image is determined.

In Step S203, when the user does not designate the card type, the card type can be determined based on the edge-size, or can be further determined from photographing according to the determined edge-size information. Of course, in other embodiments, after the card type indicated by the request event for information identification is determined in Step S201, the disclosed method can be performed to only obtain the edge-size information of the card image in Step S203, while there is no need to determine the card type once again.

In Step S204, location information of an identification area set by the card type is obtained. The location information of the identification area includes location information of the identification area in a card with respect to an edge of the card. That is, based on the card type, the location information of identification area is searched regarding to the card type. The location information of the identification area includes the location information of the identification area pre-set for the card type in the card with respect to an edge of the card.

In Step S205, based on the location information of the identification area and the edge-size information, the target area of the card image is determined and marked. The image of the target area is extracted. The method of marking target area can be referred to FIG. 2 or FIG.

3. After the target area is identified, the image of the target area can be captured by the application function of image editing.

In Step S206, based on a pre-set character pattern library, character shapes to be identified in the image of the target area are determined. According to each character shape to be identified that is determined and according to the character pattern library, a character corresponding to each character shape to be identified is identified.

The pre-set character pattern library includes features of character shapes of, e.g., Arabic digits, texts (e.g., Chinese characters, alphabets, etc.), etc. According to the character pattern library, the character to be identified of each doubtful digit/number or text in the target area can be obtained. Then, based on the shape of the character to be identified and combing with the font characteristic in the character pattern library, the specific content of the doubtful digit or text can be compared and identified to obtain a corresponding character.

In a specific embodiment, after the target area is obtained, the small images in the target area can be identified using existing identification technologies, so as to simply and rapidly obtain the character represented by the image of target area. After obtaining each character in the target area, the terminal can display to the user for the user to check and verify, or when the identified character has characteristics of the bank card, according to the payment application opened by the user, the identified character can be sent to the server corresponding to the payment application.

As disclosed, after photographing a card image from a collection area, a terminal can analyze the location of the card image to obtain an image of an area portion. Image identification based on the character shape can then be performed. In this manner, all kinds of cards (especially all kinds of bank cards) or information of ID cards needed by a user can be rapidly, effectively identified. Resources waste can be avoided. Further, the card type can be determined by determining designated size recognition to further ensure the accuracy for determining the target location and to further ensure to identify and obtain the effective information.

Figure 6:
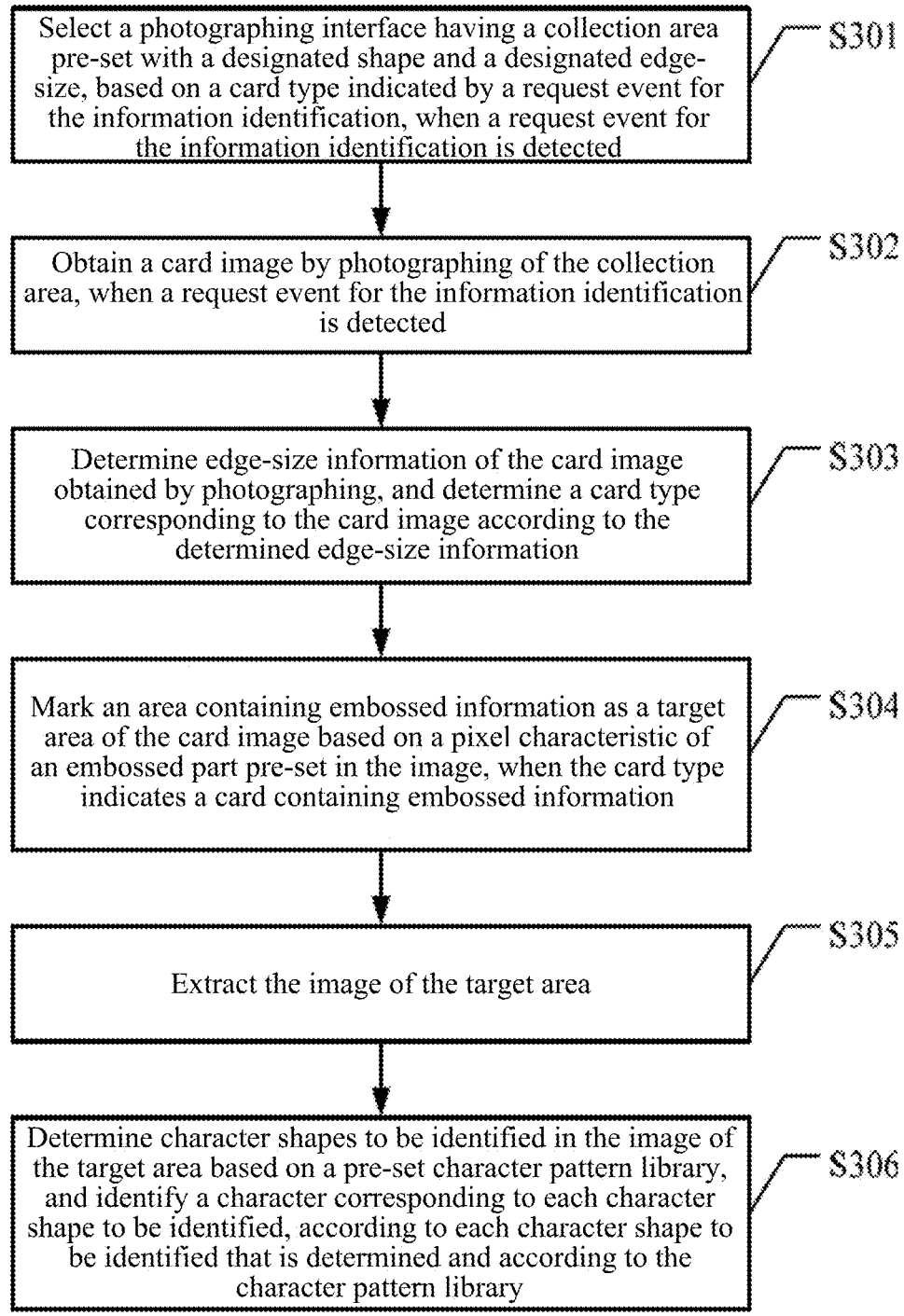
FIG. 6 depicts another exemplary method for information identification consistent with various disclosed embodiments.

FIG. 6 depicts another exemplary method for information identification consistent with various disclosed embodiments. The exemplary method can be performed by various smart terminals.

In Step S301, when a request event for an information identification is detected, a photographing interface having a collection area pre-set with a designated shape and a designated edge-size is selected based on a card type indicated by the request event for the information identification.

In one embodiment, after turning on a corresponding application, the user can designate a card type of a card to be identified. For example, a user can designate to identify a bank card or an ID card. For different card types, the collection area with different sizes and different shapes and the regarded photographing interface can be configured, in order to completely photograph to obtain a card image. In addition, based on different card types, different location information of identification area, used for determining the relative location of the target area needs to be identified in the card, can be configured.

In Step S302, when the request event for photographing is detected, the card image of the collection area is obtained by photographing.

In one embodiment, after performing Step S301, photographing direction and photographing distance can be adjusted to facilitate subsequent extracting of the target area and determination of the characters from a positive and a negative direction. After selecting a suitable photographing direction and distance, a corresponding button can be pressed to initiate a photographing request. The terminal can then obtain the card image of the collection area by photographing through the camera in the system of the terminal. In various embodiments, photographing can include taking a picture or recording a video.

In Step S303, edge-size information of the card image obtained by photographing is determined. According to the determined edge-size information, a card type corresponding to the card image is determined.

In Step S303, when the user does not designate the card type, the card type can be determined based on the edge-size, or can be further determined from photographing according to the determined edge-size information. Of course, in other embodiments, after the card type indicated by the request event for information identification is determined in Step S301, the disclosed method can be performed to only obtain the edge-size information of the card image in Step S303, while there is no need to determine the card type once again.

In Step S304, when the card type indicates a card containing embossed information, based on a pixel characteristic of an embossed part pre-set in the image, an area containing the embossed information is marked as the target area of the card image.

In Step S305, the image of the target area is extracted. When the most cards of this kind contain the embossed digits/figures or text information, based on the embossment, the target area to be identified is marked. Otherwise, the target area is marked by the above described Step S304. Because the pixel of embossment in the image has the special characteristics, the target area for information identification can be accurately and directly determined. After the target area is identified, the image of target area can be captured by the application function of image editing.

In Step S306, character shapes to be identified in the image of the target area is determined based on a pre-set character pattern library. According to each character shape to be identified that is determined and according to the character pattern library, a character corresponding to each character shape to be identified is identified. The pre-set character pattern library includes features of character shapes of, e.g., Arabic digits/figures, texts (e.g., Chinese characters, alphabets, etc.), etc. According to the character pattern library, the character to be identified of each doubtful digit/figure or text in the target area can be obtained. Then, based on the shape of the character to be identified and combing with the font characteristic in the character pattern library, the specific content of the doubtful digit or text can be compared and identified to obtain a corresponding character.

In a specific embodiment, after the target area is obtained, the small images in the target area can be identified using existing identification technologies, so as to simply and rapidly obtain the character represented by the image of target area. After obtaining each character in the target area, the terminal can display to the user for the user to check and verify, or when the identified character has characteristics of the bank card, according to the payment application opened by the user, the identified character can be sent to the server corresponding to the payment application.

As disclosed, after photographing a card image from a collection area, a terminal can analyze the location of the card image to obtain an image of an area portion. Image identification based on the character shape can then be performed. In this manner, all kinds of cards (especially all kinds of bank cards) or information of ID cards needed by a user can be rapidly, effectively identified. Resources waste can be avoided. Further, the card type can be determined by determining designated size recognition to further ensure the accuracy for determining the target location and to further ensure to identify and obtain the effective information.

Figure 7:
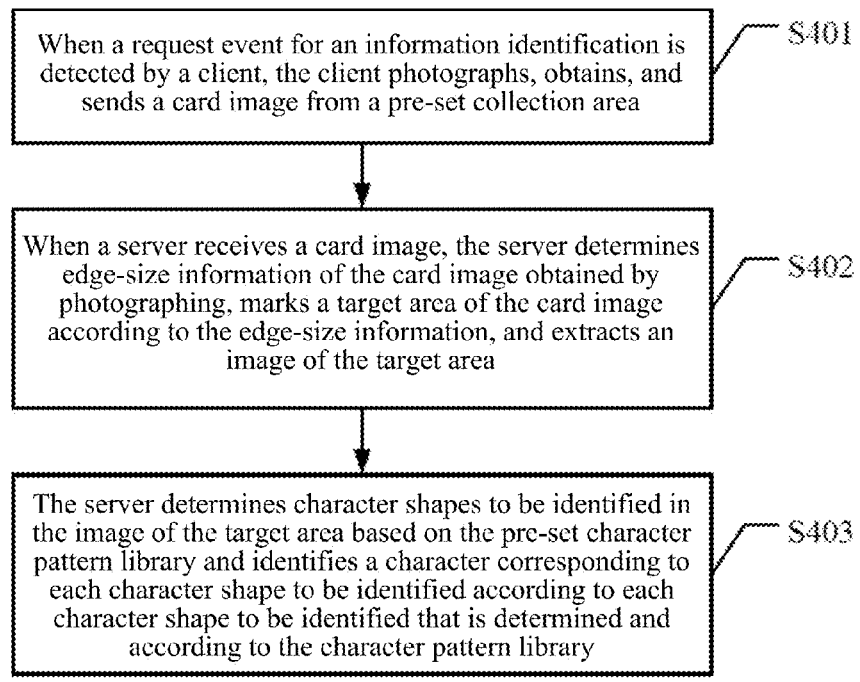
FIG. 7 depicts another exemplary method for information identification consistent with various disclosed embodiments.

FIG. 7 depicts another exemplary method for information identification consistent with various disclosed embodiments. The exemplary method can be performed by interaction between a client and a server.

In step S401, when a request event for an information identification is detected by a client, the client photographs and obtains a card image from a pre-set collection area, and sends the card image.

After turning on a corresponding application function on a client, when the user starts an information identification request, for example, by clicking a corresponding photographing button of information identification, to perform the exemplary Step S401, the user can firstly call the photographing interface. After aligning the image to be photographed and pressing the photographing button, the card image can be obtained by photographing from a pre-set collection area.

The card image includes an image of a user bank card, an image of an ID (identification) card, an image of a business card, or images of other cards. These cards include the information that needs to be identified, such as the card number information by coating bank card number on the bank card, user ID number information printed by planography. The pre-set collection area corresponds to a photographing interface having the collection area pre-set with a designated shape and a designated edge-size. The photographing interface may include various forms, such as an interface of a rectangle collection area used for photographing a bank card or an ID card, or an interface for obtaining a circular collection area for photographing circular cards. Through the above photographing interface including the collection area, the client can only obtain the card image to be identified. This effectively reduces workload for subsequent identification process.

Further, when the client detects a request event for an information identification, a card image is obtained by photographing from a pre-set collection area. When a request event for an information identification is detected, a photographing interface having a collection area pre-set with a designated shape and a designated edge-size is selected based on a card type indicated by the request event for the information identification. When a request event for photographing is detected, the card image of the collection area is obtained by photographing.

In Step S402, when the server receives a card image, edge-size information of the card image obtained by photographing is determined. According to the edge-size information, a target area of the card image is marked. An image of the target area is extracted.

For example, the edge-size can simply be determined based on the number of pixel points. The target area actually is a relative area pre-set for this type of card, which is a pre-set identification area location. In an example for bank cards, the target area can be simply set in a location of the bank card as exemplarily shown in FIG. 2. Each side in a length direction (as opposed to a width direction) of the rectangular target area 260 is distanced from a corresponding side in a length direction of the bank card by, e.g., about ¼ to about ⅓, of a width of the bank card, while the two sides in a width direction of the rectangular target area can overlap with corresponding sides of the bank card, as shown in FIG. 2. Because the target area corresponds to the card image, e.g., the target area can be proportionally reduced or enlarged with respect to the area of the bank card, the disclosed method can be applied to any card with any dimensions.

In other embodiments, the actual and more accurate card dimension information can be obtained by measuring distances and angles to card edges combined with the geometry calculation models. Such card dimension information can be used as edge-size information of the card image as used for the Step S402 and be combined with the location of identification area which is pre-set for the bank card, to determine the target area based on the accurate size information as shown in FIG. 3. After the target area is determined, the image of the target area in the card image is obtained by collecting through the image editing tools. Because the relative location of target area in the card is configured by statistics based on a large amount cards in a same catalog (or same kinds) or by a user directly based on the card to be identified before implementing this method, the target area containing information of required numbers and/or words can be ensured to be obtained in Step S402.

Further, the Step S402 may include: determining edge-size information of the card image obtained by photographing; determining a card type corresponding to the card image according to the determined edge-size information; obtaining location information of the identification area set by the card type, the location information of the identification area including location information of the identification area in the card with respect to the edge of the card; determining and marking the target area of the card image, and extracting the image of the target area, based on the location information of the identification area and the edge-size information.

Alternatively, Step S402 may include: determining the edge-size information of the card image obtained by photographing, and according to the edge-size information, determining the card type corresponding to the card image; when the card type indicates the card containing embossed information, based on the pixel characteristic of the embossed part pre-set in the image, marking the area containing the embossed information as the target area of the card image; and extracting the image of the target area.

In Step S403, based on the pre-set character pattern library, the server determines character shapes to be identified in the image of the target area. According to each character shape to be identified that is determined and according to the character pattern library, a character corresponding to each character shape to be identified is identified. The pre-set character pattern library includes features of character shapes of, e.g., Arabic digits/figures, texts (e.g., Chinese characters, alphabets, etc.), etc. According to the character pattern library, the character to be identified of each doubtful digit/figure or text in the target area can be obtained. Then, based on the shape of the character to be identified and combing with the font characteristic in the character pattern library, the specific content of the doubtful digit or text can be compared and identified to obtain a corresponding character.

In a specific embodiment, after the target area is obtained, the server further may identify the small images in the target area using existing identification technologies, so as to simply and rapidly obtain the character represented by the image of target area. After obtaining each character in the target area, the terminal can display to the user for the user to check and verify, or when the identified character has characteristics of the bank card, according to the payment application opened by the user, the identified character can be sent to the server corresponding to the payment application.

As disclosed, after photographing a card image from a collection area, a client can analyze the location of the card image to obtain an image of an area portion. Image identification based on the character shape can then be performed. In this manner, all kinds of cards (especially all kinds of bank cards) or information of ID cards needed by a user can be rapidly, effectively identified. Resources waste can be avoided.

Figure 8:
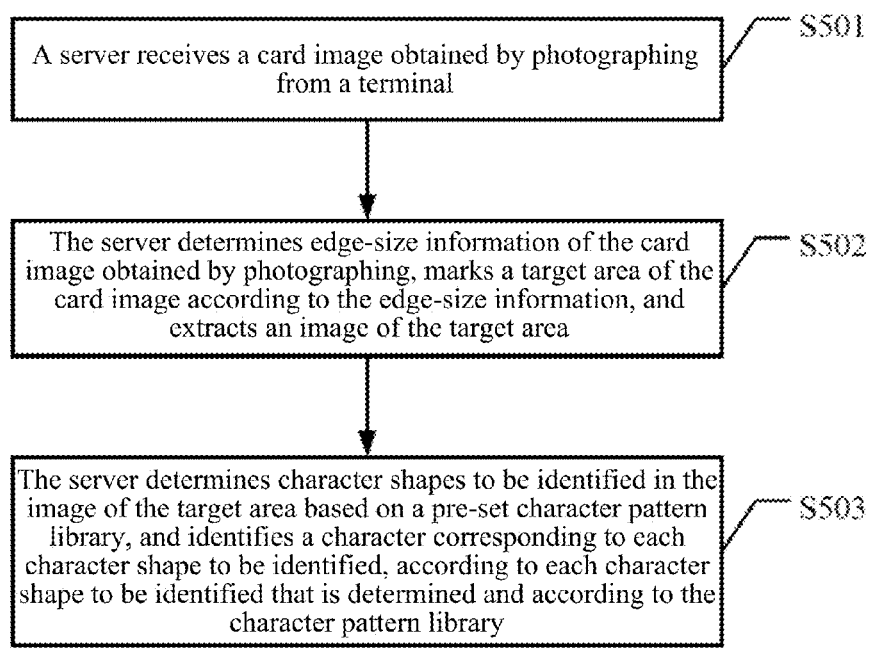
FIG. 8 depicts another exemplary method for information identification consistent with various disclosed embodiments.

FIG. 8 depicts another exemplary method for information identification consistent with various disclosed embodiments. The exemplary method can be performed by a server.

In Step S501, a server receives a card image obtained by photographing from a terminal. For example, methods of obtaining a card image by photographing from a terminal can refer to the methods described in FIGS. 1-7. The server can receive the card image sent from the terminal through a computer network, a communication network etc.

In Step S502, the server determines edge-size information of the card image obtained by photographing. According to the edge-size information, a target area of the card image is marked. An image of the target area is extracted.

For example, the edge-size can simply be determined based on the number of pixel points. The target area actually is a relative area pre-set for this type of card, which is a pre-set identification area location. In an example for bank cards, the target area can be simply set in a location of the bank card as exemplarily shown in FIG. 2. Each side in a length direction (as opposed to a width direction) of the rectangular target area 260 is distanced from a corresponding side in a length direction of the bank card by, e.g., about ¼ to about ⅓, of a width of the bank card, while the two sides in a width direction of the rectangular target area can overlap with corresponding sides of the bank card, as shown in FIG. 2. Because the target area corresponds to the card image, e.g., the target area can be proportionally reduced or enlarged with respect to the area of the bank card, the disclosed method can be applied to any card with any dimensions and the server does not need to measure the absolution dimensions of the card.

In other embodiments, the server can obtain actual and more accurate card dimension information by measuring distances and angles to card edges combined with the geometry calculation models. Such card dimension information can be used as edge-size information of the card image as used for the Step S502 and be combined with the location of identification area which is pre-set for the bank card, to determine the target area based on the accurate size information as shown in FIG. 3. After the target area is determined, the server obtains the image of the target area in the card image by collecting through the image editing tools. Because the relative location of target area in the card is configured by statistics based on a large amount cards in a same catalog (or same kinds) or by a user directly based on the card to be identified before implementing this method, the target area containing information of required numbers and/or words can be ensured to be obtained in Step S502.

Further, the Step S502 may include: determining edge-size information of the card image obtained by photographing; determining a card type corresponding to the card image according to the determined edge-size information; obtaining location information of the identification area set by the card type, the location information of the identification area including location information of the identification area in the card with respect to the edge of the card; determining and marking the target area of the card image, and extracting the image of the target area, based on the location information of the identification area and the edge-size information.

Alternatively, Step S502 may include: determining the edge-size information of the card image obtained by photographing, and according to the edge-size information, determining the card type corresponding to the card image; when the card type indicates the card containing embossed information, based on the pixel characteristic of the embossed part pre-set in the image, marking the area containing the embossed information as the target area of the card image; extracting the image of the target area.

In Step S503, based on the pre-set character pattern library, the server determines character shapes to be identified in the image of the target area. According to each character shape to be identified that is determined and according to the character pattern library, a character corresponding to each character shape to be identified is identified. The pre-set character pattern library includes features of character shapes of, e.g., Arabic digits/figures, texts (e.g., Chinese characters, alphabets, etc.), etc. According to the character pattern library, the server obtains the character to be identified of each doubtful digit/figure or text in the target area. Then, based on the shape of the character to be identified and combing with the font characteristic in the character pattern library, the specific content of the doubtful digit or text can be compared and identified to obtain a corresponding character.

In a specific embodiment, after the target area is obtained, the server further may identify the small images in the target area using existing identification technologies, so as to simply and rapidly obtain the character represented by the image of target area. After obtaining each character in the target area, the server can return the identified character to the terminal for the terminal to display for the user to check and verify, and/or when the identified character has characteristics of the bank card, according to the payment application opened by the user, the identified character can be sent to the server corresponding to the payment application.

As disclosed, after photographing a card image from a collection area, a terminal can analyze the location of the card image to obtain an image of an area portion. Image identification based on the character shape can then be performed. In this manner, all kinds of cards (especially all kinds of bank cards) or information of ID cards needed by a user can be rapidly, effectively identified. Resources waste can be avoided. Further, the card type can be determined by determining designated size recognition to further ensure the accuracy for determining the target location and to further ensure to identify and obtain the effective information.

Figure 9:
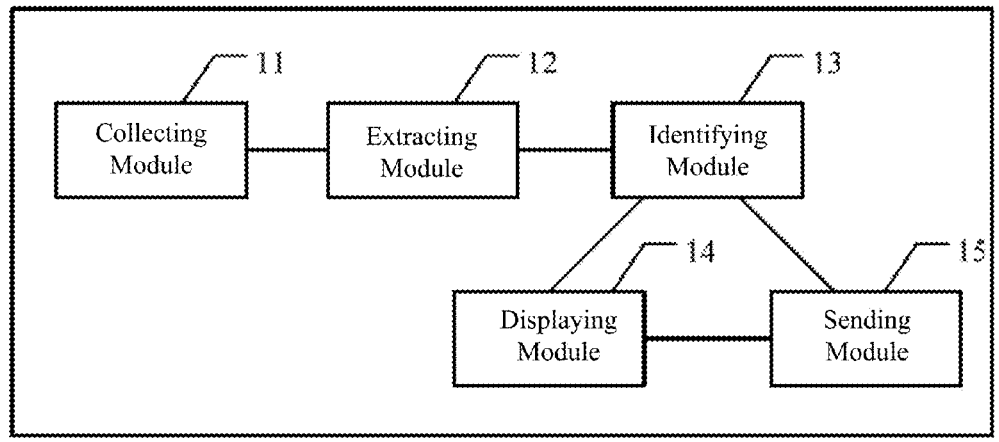
FIG. 9 depicts an exemplary apparatus for information identification consistent with various disclosed embodiments.

FIG. 9 depicts an exemplary apparatus for information identification consistent with various disclosed embodiments. The exemplary apparatus can be configured in various smart terminals. The exemplary apparatus can include a collecting module 11, an extracting module 12, and/or an identifying module 13.

The collecting module 11 is configured to obtain the card image by photographing from the collection area that is pre-set, when the request event of the information identification is detected.

The extracting module 12 is configured to determine edge-size information of the card image obtained by photographing, and according to the edge-size information, to mark the target area of the card image, and to extract the image of the target area.

The identifying module 13 is configured to determine character shapes to be identified in the image of the target area based on the pre-set character pattern library; and according to each character shape to be identified that is determined and according to the character pattern library, to identify a character corresponding to each character shape to be identified.

After turning on a corresponding application function on a terminal, when the user starts an information identification request, for example, by clicking a corresponding photographing button of information identification. The collecting module 11 can firstly call the photographing interface. After aligning the image to be photographed and pressing the photographing button, the card image can be obtained by photographing from a pre-set collection area.

The collecting module 11 can collect card images including an image of a user bank card, an image of an ID (identification) card, an image of a business card, or images of other cards. These cards include the information that needs to be identified, such as the card number information by coating bank card number on the bank card, user ID number information printed by planography. The pre-set collection area corresponds to a photographing interface having the collection area pre-set with a designated shape and a designated edge-size. The photographing interface may include various forms, such as an interface of a rectangle collection area used for photographing a bank card or an ID card, or an interface for obtaining a circular collection area for photographing circular cards.

For example, the extracting module 12 can determine the edge-size simply based on the number of pixel points. The target area actually is a relative area pre-set for this type of card, which is a pre-set identification area location. In an example for bank cards, the target area can be simply set in a location of the bank card as exemplarily shown in FIG. 2. Each side in a length direction (as opposed to a width direction) of the rectangular target area 260 is distanced from a corresponding side in a length direction of the bank card by, e.g., about ¼ to about ⅓, of a width of the bank card, while the two sides in a width direction of the rectangular target area can overlap with corresponding sides of the bank card, as shown in FIG. 2. Because the target area corresponds to the card image, e.g., the target area can be proportionally reduced or enlarged with respect to the area of the bank card, the disclosed method can be applied to any card with any dimensions and the extracting module does not need to determine the absolution dimensions of the card.

In other embodiments, the extracting module 12 can obtain actual and more accurate card dimension information by measuring distances and angles to card edges combined with the geometry calculation models. Such card dimension information can be used as edge-size information of the card image and be combined with the location of identification area which is pre-set for the bank card, to determine the target area based on the accurate size information as shown in FIG. 3. After the target area is determined, the server obtains the image of the target area in the card image by collecting through the image editing tools. Because the relative location of target area in the card is configured by statistics based on a large amount cards in a same catalog (or same kinds) or by a user directly based on the card to be identified before implementing this method, the target area containing information of required numbers and/or words can be ensured to be obtained by the extracting module 12.

Figure 10:
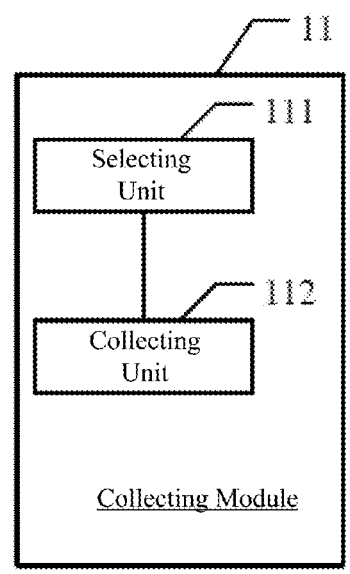
FIG. 10 depicts an exemplary collecting module of an apparatus in FIG. 9 consistent with various disclosed embodiments.

In addition, as shown in FIG. 10, the collecting module 11 can include a selecting unit 111, and a collecting unit 112.

The selecting unit 111 is configured, when a request event for an information identification is detected, to select a photographing interface having a collection area pre-set with a designated shape and a designated edge-size based on a card type indicated by the request event for the information identification.

The collecting unit 112 is configured, when a request event for photographing is detected, to obtain the card image of the collection area by photographing.

In one embodiment, after turning on a corresponding application, the user can designate a card type of a card to be identified. For example, a user can designate to identify a bank card or an ID card. For different card types, the collection area with different sizes and different shapes and the regarded photographing interface can be configured, in order to completely photograph to obtain a card image. The selecting unit 111 can be configured to select suitable photographing interface based on different card types. In addition, based on different card types, different location information of identification area, used for determining the relative location of the target area needs to be identified in the card, can be configured.

In one embodiment, a user can adjust photographing direction and photographing distance to facilitate subsequent extracting of the target area and determination of the characters from a positive and a negative direction. After selecting a suitable photographing direction and distance, a corresponding button can be pressed to initiate a photographing request. The collecting unit 112 can then obtain the card image of the collection area by photographing through the camera in the system of the terminal. In various embodiments, photographing can include taking a picture or recording a video.

Figure 11:
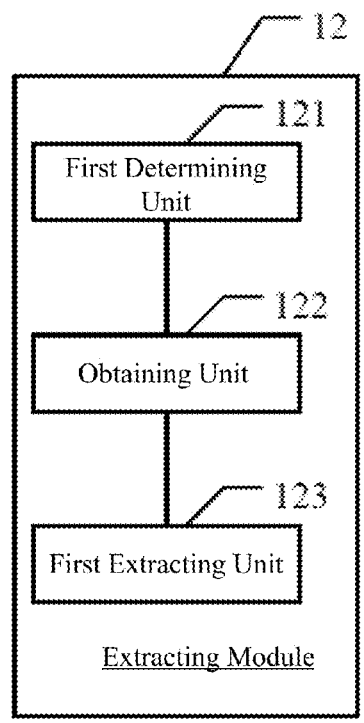
FIG. 11 depicts an exemplary extracting module of an apparatus in FIG. 9 consistent with various disclosed embodiments.

In addition, in one embodiment, referring to FIG. 11, the extracting module 12 includes: a first determining unit 121, an obtaining unit 122, and/or a first extracting unit 123.

The first determining unit 121 is configured to determine the edge-size information of the card image obtained by photographing, and according to the determined edge-size information, to determine the card type corresponding to the card image.

The obtaining unit 122 is configured to obtain location information of the identification area set by the card type. The location information of the identification area includes location information of the identification area in the card with respect to the edge of the card.

The first extracting unit 123 is configured to determine and mark the target area of the card image, and to extract the image of the target area, based on the obtained location information of the identification area and the edge-size information.

Figure 12:
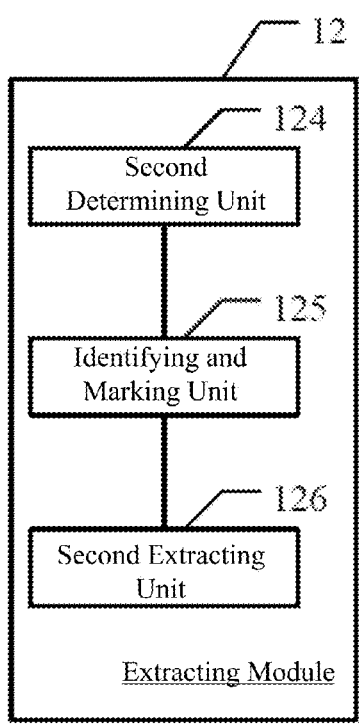
FIG. 12 depicts another exemplary extracting module of an apparatus in FIG. 9 consistent with various disclosed embodiments.

In addition, referring to FIG. 12, the extracting module 12 includes: a second determining unit 124, an identifying and marking unit 125, and/or a second extracting unit 126.

The second determining unit 124 is configured to determine the edge-size information of the card image obtained by photographing, and according to the edge-size information, to determine the card type corresponding to the card image.

The identifying and marking unit 125 is configured, when the card type indicates the card containing embossed information, based on the pixel characteristic of the embossed part pre-set in the image, to mark the area containing the embossed information as the target area of the card image. The second extracting unit 126 is configured to extract the image of the target area.

In one embodiment, the extracting module 12 can include all of the first determining unit 121, the obtaining unit 122, the first extracting unit 123, the second determining unit 124, the identifying and marking unit 125, and the second extracting unit 126 together in one apparatus.

In addition, in one embodiment, the apparatus further includes: a displaying module 14 and/or a sending module 15. The displaying module 14 is configured to display the identified character. The sending module 15 is configured, when the identified character includes the characteristic for the bank card number, according to the payment application turned on by the user, to send the identified character to the server corresponding to the payment application.

As disclosed, after photographing a card image from a collection area, a client/terminal can analyze the location of the card image to obtain an image of an area portion. Image identification based on the character shape can then be performed. In this manner, all kinds of cards (especially all kinds of bank cards) or information of ID cards needed by a user can be rapidly, effectively identified. Resources waste can be avoided. Further, the card type can be determined by determining designated size recognition to further ensure the accuracy for determining the target location and to further ensure to identify and obtain the effective information.

Figure 13:
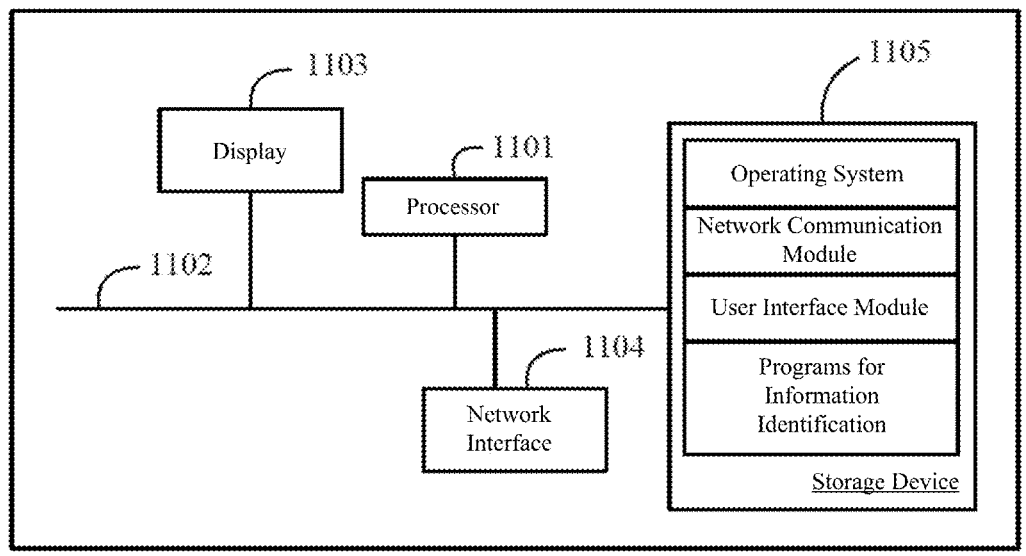
FIG. 13 depicts an exemplary user terminal consistent with various disclosed embodiments.

FIG. 13 depicts an exemplary user terminal consistent with various disclosed embodiments. The terminal includes: at least one processor 1101 (e.g., a CPU), at least one communication bus 1102, a display 1103, at least one network interface 1104, and/or a storage device 1105.

The communication bus 1102 is configured to implement connection communication between components. The network interface 1104 optionally includes a standard wired interface, a wireless interface (e.g., WI-FI interface, mobile communication interface, etc.). The storage device 1105 may include a high-speed RAM storage, or a non-volatile memory, for example at least one disk storage device. The storage device 1105 optionally may further be at least one storage device remotely from the above-mentioned processor 1101.

As shown in FIG. 13, as a computer readable storage medium, the storage device 1105 may include an operating system, a network communication module, and a user interface module, and may store programs for information identification and other suitable programs.

For example, the processor 1101 is configured to call the program for performing information identification stored in the storage device 1105 to implement the following exemplary steps.

A card image by photographing of a collection area that is pre-set is obtained when a request event for an information identification is detected. Edge-size information of the card image obtained by photographing is determined. A target area of the card image is marked according to the edge-size information. An image of the target area is extracted. Character shapes to be identified in the image of the target area is determined based on a pre-set character pattern library. A character corresponding to each character shape to be identified is identified according to each character shape to be identified that is determined and according to the character pattern library.

The step of obtaining the card image by photographing from the collection area includes: selecting a photographing interface having the collection area pre-set with a designated shape and a designated edge-size based on a card type indicated by the request event of the information identification, when the request event of the information identification is detected; and obtaining the card image of the collection area by photographing, when a request event for photographing is detected.

The step of determining the edge-size information of the card image and extracting the image of the target area includes: determining the edge-size information of the card image obtained by photographing, and determining the card type corresponding to the card image according to the determined edge-size information; obtaining location information of an identification area set by the card type, wherein the location information of the identification area includes location information of the identification area in a card with respect to an edge of the card; and determining and marking the target area of the card image, and extracting the image of the target area, based on the location information of the identification area and the edge-size information.

The step of determining the edge-size information of the card image and extracting the image of the target area includes: determining the edge-size information of the card image obtained by photographing, and according to the edge-size information, determining the card type corresponding to the card image; marking an area containing the embossed information as the target area of the card image based on a pixel characteristic of an embossed part pre-set in the image, when the card type indicates a card containing embossed information;

and extracting the image of the target area.

In addition, when implemented by the processor 1101, the identified character is displayed by the display 1103 and/or, via the network interface 1104, when the identified character has the characteristic of bank card, the processor 1101 sends the identified character to the server corresponding to the payment application, according to the payment application turned on by user.

As disclosed, after photographing a card image from a collection area, a terminal can analyze the location of the card image to obtain an image of an area portion. Image identification based on the character shape can then be performed. In this manner, all kinds of cards (especially all kinds of bank cards) or information of ID cards needed by a user can be rapidly, effectively identified. Resources waste can be avoided. Further, the card type can be determined by determining designated size recognition to further ensure the accuracy for determining the target location and to further ensure to identify and obtain the effective information.

Figure 14:
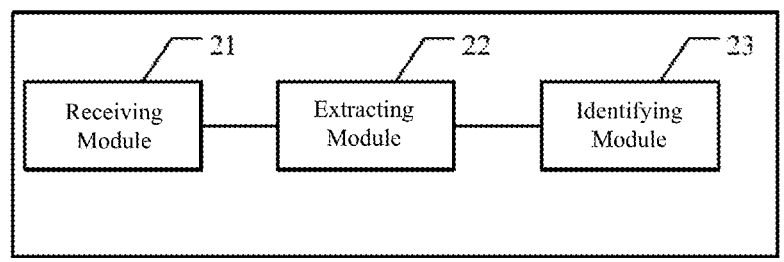
FIG. 14 depicts another exemplary apparatus for information identification consistent with various disclosed embodiments.

FIG. 14 depicts another exemplary apparatus for information identification consistent with various disclosed embodiments. The exemplary apparatus can be configured in a server for information identification. The exemplary apparatus includes a receiving module 21, an extracting module 22, and/or an identifying module 23.

The receiving module 21 is configured to receive the card image obtained by photographing from a terminal. The extracting module 22 is configured to determine edge-size information of the card image obtained by photographing, and according to the edge-size information, to mark the target area of the card image, and to extract an image of the target area.

The identifying module 23 is configured to determine character shapes to be identified in the image of the target area based on the pre-set character pattern library; and according to each character shape to be identified that is determined and according to the character pattern library, to identify the character corresponding to each character shape to be identified.

For example, methods of obtaining a card image by photographing from a terminal can refer to various embodiments described herein. The receiving module 21 can receive the card image sent from the terminal through a computer network, a communication network etc. The extracting module 22 and the identifying module 23 can be configured to perform the disclosed methods as described above.

In addition, the extracting module 23 is configured to determine edge-size information of the card image obtained by photographing; determine a card type corresponding to the card image according to the determined edge-size information; obtain location information of the identification area set by the card type, the location information of the identification area including location information of the identification area in the card with respect to the edge of the card; determine and mark the target area of the card image, and extract the image of the target area, based on the location information of the identification area and the edge-size information.

Alternatively, the extracting module 23 is configured to: determine the edge-size information of the card image obtained by photographing, and according to the edge-size information, to determine the card type corresponding to the card image; when the card type indicates the card containing embossed information, based on the pixel characteristic of the embossed part pre-set in the image, to mark the area containing the embossed information as the target area of the card image; and to extract the image of the target area.

After the identifying module 23 identifies a corresponding character in the target area, the apparatus may further send the identified results to a corresponding client through a sending module and, of course, can process corresponding business for the terminal based on the identified character.

For example, a server is used for completing the user payment. When the character is a bank card number of a user for performing payment, the server performs the payment process for this card number directly.

As disclosed, after photographing a card image from a collection area, a client can analyze the location of the card image to obtain an image of an area portion. Image identification based on the character shape can then be performed. In this manner, all kinds of cards (especially all kinds of bank cards) or information of ID cards needed by a user can be rapidly, effectively identified. Resources waste can be avoided.

Figure 15:
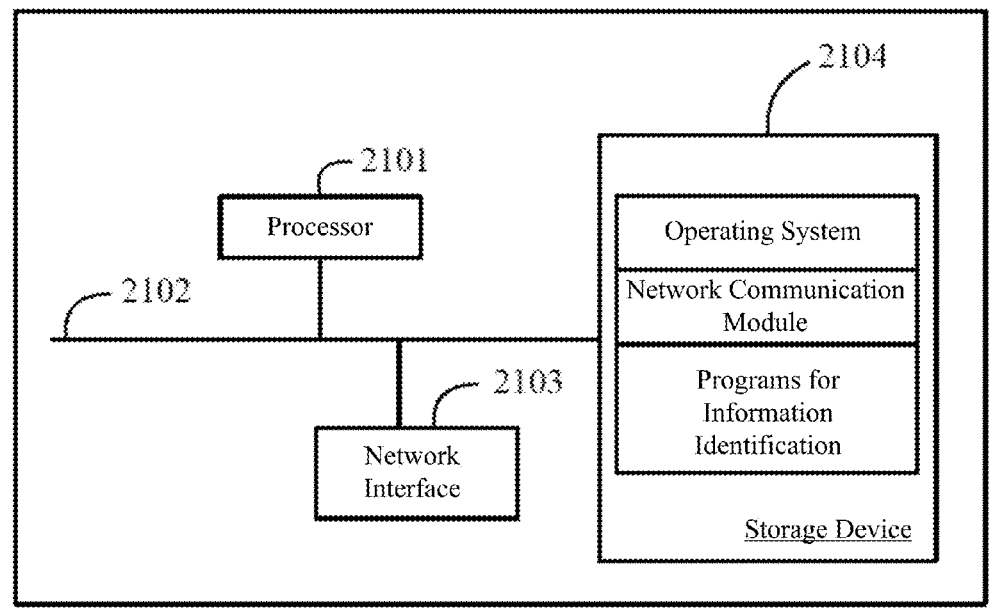
FIG. 15 depicts an exemplary server consistent with various disclosed embodiments.

FIG. 15 depicts an exemplary server consistent with various disclosed embodiments. The terminal includes: at least one processor 2101 (e.g., a CPU), at least one communication bus 2102, at least one network interface 2103, and/or a storage device 2104.

The communication bus 2102 is configured to implement connection communication between components. Optionally, the network interface 2103 includes a standard wired interface, a wireless interface (e.g., WI-FI interface, mobile communication interface etc.). The storage device 2104 may include a high-speed RAM storage, or a non-volatile memory, for example at least one disk storage device. Optionally, the storage device 2104 may further be at least one storage device remotely from the above-mentioned processor 2101.

As shown in FIG. 15, as a computer readable storage medium, the storage device 2104 may include an operating system, a network communication module, and may store programs for information identification and other suitable programs.

For example, the processor 2101 is configured to call the program for performing information identification stored in the storage device 2104, and to implement the following exemplary steps including: receiving the card image obtained by photographing from a terminal through the network interface 2103; determining edge-size information of the card image obtained by photographing, according to the edge-size information, marking the target area of the card image, and extracting the image of the target area; and based on the pre-set character pattern library, determining character shapes to be identified in the image of the target area; and according to each character shape to be identified that is determined and the character pattern library, identifying the character corresponding to each character shape to be identified.

The processor 2101 may return the identified character to the terminal through the network interface 2103. Of course, corresponding business can be processed for the terminal based on the identified character. For example, a server can be used for completing the user payment. When the character is a bank card number of a user for performing payment, the server performs the payment process for this card number directly.

As disclosed, after photographing a card image from a collection area, a client can analyze the location of the card image to obtain an image of an area portion. Image identification based on the character shape can then be performed. In this manner, all kinds of cards (especially all kinds of bank cards) or information of ID cards needed by a user can be rapidly, effectively identified. Resources waste can be avoided.

Figure 16:
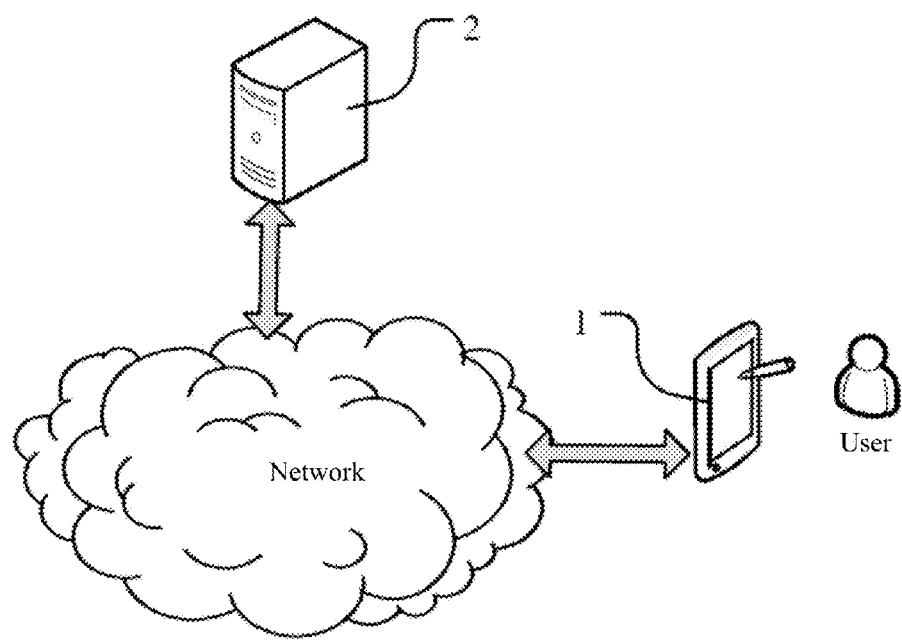
FIG. 16 depicts an exemplary system for information identification consistent with various disclosed embodiments.

FIG. 16 depicts an exemplary system for information identification consistent with various disclosed embodiments. The exemplary system can include a terminal 1 and a server 2.

The terminal 1 is configured to obtain the card image by photographing from the collection area that is pre-set, and to send the card image obtained by photographing to the server, when the request event for the information identification is detected.

The server 2 is configured, when the server receives the card image, to determine the edge-size information of the card image obtained by photographing, and according to the edge-size information, to mark the target area of the card image, and to extract the image of the target area.

The server 2 is further configured to determine character shapes to be identified in the image of the target area based on the pre-set character pattern library, and according to each character shape to be identified that is determined and according to the character pattern library, to identify the character corresponding to each character shape to be identified.

For example, when the request event for the information identification is detected, that the terminal 1 obtains the card image by photographing from the pre-set collection area may include: when the request event for the information identification is detected, based on the card type indicated by the request event for the information identification, selecting the photographing interface having the collection area pre-set with a designated shape and a designated edge-size; and when the request event for photographing is detected, obtaining the card image of the collection area by photographing.

That the server 2 determines edge-size information of the card image obtained by photographing, according to the edge-size information, marks the target area of the card image, and extracts the image of the target area may include: determining the edge-size information of the card image obtained by photographing, and according to the determined edge-size information, determining the card type corresponding to the card image; obtaining location information of the identification area set by the card type, wherein the location information of the identification area includes location information of the identification area in the card with respect to the edge of the card; determining and marking the target area of the card image, and extracting the image of the target area, based on the location information of the identification area and the edge-size information.

Alternatively, the server 2 determines edge-size information of the card image obtained by photographing, according to the edge-size information, marks the target area of the card image, and extracts the image of the target area may include: determining the edge-size information of the card image obtained by photographing, and according to the edge-size information, determining the card type corresponding to the card image; when the card type indicates the card containing embossed information, based on the pixel characteristic of the embossed part pre-set in the image, marking the area containing the embossed information as the target area of the card image; and extracting the image of the target area.

In addition, in one embodiment: the server 2 is further configured to return an identified character to the terminal. The terminal 1 is further configured to display the identified character, and/or according to a payment application turned on by a user, to send the identified character to the server corresponding to the payment application.

The server 2 may process the corresponding business for the terminal based on the identified character. For example, when the server is used for completing the user payment, and the character is the bank card number for user to process payment, the server can perform the payment process with the card number directly.

As disclosed, after photographing a card image from a collection area, a terminal can analyze the location of the card image to obtain an image of an area portion. Image identification based on the character shape can then be performed. In this manner, all kinds of cards (especially all kinds of bank cards) or information of ID cards needed by a user can be rapidly, effectively identified. Resources waste can be avoided. Further, the card type can be determined by determining designated size recognition to further ensure the accuracy for determining the target location and to further ensure to identify and obtain the effective information.

It should be noted that, in the present disclosure each embodiment is progressively described, i.e., each embodiment is described and focused on difference between embodiments. Similar and/or the same portions between various embodiments can be referred to with each other. In addition, exemplary apparatus (e.g., a server or terminal) and system are described with respect to corresponding methods.

The disclosed methods, apparatus, and/or systems can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

A person of ordinary skill in the art can understand that the modules included herein are described according to their functional logic, but are not limited to the above descriptions as long as the modules can implement corresponding functions. Further, the specific name of each functional module is used for distinguishing from on another without limiting the protection scope of the present disclosure.

As used herein, the term "module" can be software objects executed on a computing system. A variety of components described herein including elements, modules, units, engines, and services can be executed in the computing system. The apparatus, methods, and/or systems can be implemented in a software manner. Of course, the apparatus, methods, and/or systems can be implemented using hardware. All of which are within the scope of the present disclosure.

In various embodiments, the disclosed modules can be configured in one apparatus (e.g., a processing unit) or configured in multiple apparatus as desired. The modules disclosed herein can be integrated in one module or in multiple modules. Each of the modules disclosed herein can be divided into one or more sub-modules, which can be recombined in any manner.

One of ordinary skill in the art would appreciate that suitable software and/or hardware (e.g., a universal hardware platform) may be included and used in the disclosed methods, apparatus, and/or systems. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a ... " does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods, apparatus, and systems for information identification are provided herein. A card image of a pre-set collection area is photographed and obtained, when a request event for information identification is detected. Edge-size information of the card image obtained by photographing is determined. A target area of the card image is marked according to the edge-size information. An image of the target area is extracted. Character shapes to be identified in the image of the target area is determined based on a pre-set character pattern library. A character corresponding to each character shape to be identified is identified according to each character shape to be identified that is determined and according to the character pattern library.

As disclosed, after photographing a card image from a collection area, a terminal can analyze the location of the card image to obtain an image of an area portion. Image identification based on the character shape can then be performed. In this manner, all kinds of cards (especially all kinds of bank cards) or information of ID cards needed by a user can be rapidly, effectively identified. Resources waste can be avoided. Further, the card type can be determined by determining designated size recognition to further ensure the accuracy for determining the target location and to further ensure to identify and obtain the effective information.

What is claimed is:

1. A method for information identification by a user terminal having at least a processor and a camera, comprising:

obtaining a card image by photographing of a collection area that is pre-set, when a request event for an information identification is detected, including:
  obtaining a card type of a card to be identified designated by the user according to the request event of the information identification;
  displaying, on a display screen of the user terminal, a photographing interface having the collection area pre-set with a designated shape and a designated edge-size based on the card type, the collection area being a sub-area from a detection area of the camera; and
  when a request event for photographing is detected, obtaining the card image of the collection area by photographing with the camera;
determining edge-size information of the card image obtained by photographing, marking a target area of the card image according to the edge-size information; and extracting an image of the target area; and
determining character shapes to be identified in the image of the target area based on a pre-set character pattern library, and identifying a character corresponding to each character shape to be identified according to each character shape to be identified that is determined and according to the character pattern library.

2. The method according to claim 1, wherein the step of determining the edge-size information of the card image and extracting the image of the target area includes:
  determining the edge-size information of the card image obtained by photographing, and determining the card type corresponding to the card image according to the determined edge-size information;
  obtaining location information of an identification area set by the card type, wherein the location information of the identification area includes location information of the identification area in a card with respect to an edge of the card; and
  determining and marking the target area of the card image, and extracting the image of the target area, based on the location information of the identification area and the edge-size information.

3. The method according to claim 1, wherein the step of determining the edge-size information of the card image and extracting the image of the target area includes:
  determining the edge-size information of the card image obtained by photographing, and according to the edge-size information, determining the card type corresponding to the card image;
  marking an area containing the embossed information as the target area of the card image based on a pixel characteristic of an embossed part pre-set in the image, when the card type indicates a card containing embossed information; and
  extracting the image of the target area.

4. The method according to claim 3, further including one or more steps selected from:
  displaying an identified character; and
  sending the identified character to a server corresponding to the payment application according to a payment application turned on by a user, when the identified character includes a characteristic for a bank card number.

5. The method according to claim 1, further including:
  receiving the card image obtained by photographing from a terminal;
  determining the edge-size information of the card image obtained by photographing; marking the target area of the card image according to the edge-size information; and extracting the image of the target area; and
  determining character shapes to be identified in the image of the target area based on the pre-set character pattern library; and according to each character shape to be identified that is determined and the character pattern library, identifying the character corresponding to each character shape to be identified.

6. A method for information identification, comprising:
  obtaining, by a terminal having at least a processor and a camera, a card image by photographing of a collection area that is pre-set, and sending the card image obtained by photographing to a server having at least a processor, when a request event for an information identification is detected;
  determining, by the server, edge-size information of the card image obtained by photographing when the server receives the card image, marking a target area of the card image according to the edge-size information, and extracting an image of the target area; and
  determining, by the server, character shapes to be identified in the image of the target area based on a pre-set character pattern library; and identifying a character corresponding to each character shape to be identified, according to each character shape to be identified that is determined and according to the character pattern library;
  wherein obtaining the card image further comprises:
    obtaining a card type of a card to be identified designated by the user according to the request event of the information identification;
    displaying, on a display screen of the user terminal, a photographing interface having the collection area pre-set with a designated shape and a designated edge-size based on the card type, the collection area being a sub-area from a detection area of the camera; and
    when a request event for photographing is detected, obtaining the card image of the collection area by photographing with the camera.

7. The method according to claim 6, further including one or more steps selected from:
  returning, by the server, an identified character to the terminal;
  displaying, by the terminal, the identified character; and
  according to a payment application turned on by a user, sending, by the terminal, the identified character to the server corresponding to the payment application.

8. An apparatus for information identification, comprising:
  a collecting module, configured to obtain a card image by photographing of a collection area that is pre-set, when a request event of an information identification is detected, including:
    obtaining a card type of a card to be identified designated by the user according to the request event of the information identification;
    displaying, on a display screen of the user terminal, a photographing interface having the collection area pre-set with a designated shape and a designated edge-size based on the card type, the collection area being a sub-area from a detection area of the camera; and
    when a request event for photographing is detected, obtaining the card image of the collection area by photographing with the camera;

an extracting module, configured to determine edge-size information of the card image obtained by photographing; to mark a target area of the card image according to the edge-size information; and to extract an image of the target area; and an identifying module, configured to determine character shapes to be identified in the image of the target area based on a pre-set character pattern library; and to identify a character corresponding to each character shape to be identified according to each character shape to be identified that is determined and according to the character pattern library.

9. The apparatus according to claim 8, wherein the extracting module includes:
a first determining unit, configured to determine the edge-size information of the card image obtained by photographing, and according to the determined edge-size information, to determine the card type corresponding to the card image;
an obtaining unit, configured to obtain location information of an identification area set by the card type, wherein the location information of the identification area includes location information of the identification area in a card with respect to an edge of the card; and
a first extracting unit, configured to determine and mark the target area of the card image, and to extract the image of the target area, based on the obtained location information of the identification area and the edge-size information.

10. The apparatus according to claim 8, wherein the extracting module includes:
a second determining unit, configured to determine the edge-size information of the card image obtained by photographing, and according to the edge-size information, to determine the card type corresponding to the card image;
an identifying and marking unit configured, when the card type indicates a card containing embossed information, based on a pixel characteristic of an embossed part pre-set in the image, to mark an area containing the embossed information as the target area of the card image; and
a second extracting unit, configured to extract the image of the target area.

11. The apparatus according to claim 10, further including one or more of:
a displaying module, configured to display an identified character; and
a sending module, configured to send the identified character to a server corresponding to the payment application according to a payment application turned on by a user, when the identified character includes a characteristic for a bank card number.

12. The apparatus according to claim 8, further comprising:
a receiving module, configured to receive another card image obtained by photographing from a terminal; wherein:
the extracting module is further configured to determine edge-size information of the another card image obtained by photographing; according to the edge-size information, to mark a target area of the another card image; and to extract an image of the target area of the another card image; and the identifying module is further configured to determine character shapes to be identified in the image of the target area of the another card image based on the pre-set character pattern library; and according to each character shape to be identified that is determined and the character pattern library, to identify a character corresponding to each character shape to be identified.

13. A system for information identification comprising:
a terminal having at least a processor and a camera, and a server having at least a processor, wherein:
the terminal is configured to obtain a card image by photographing from a collection area that is pre-set, and to send the card image obtained by photographing to the server when a request event for an information identification is detected;
the server is configured, when the server receives the card image, to determine edge-size information of the card image obtained by photographing, and according to the edge-size information, to mark a target area of the card image, and to extract an image of the target area; and
the server is further configured to determine character shapes to be identified in the image of the target area based on a pre-set character pattern library; and according to each character shape to be identified that is determined and the character pattern library, to identify a character corresponding to each character shape to be identified;
wherein the terminal is further configured to:
obtain a card type of a card to be identified designated by the user according to the request event of the information identification;
display, on a display screen of the user terminal, a photographing interface having the collection area pre-set with a designated shape and a designated edge-size based on the card type, the collection area being a sub-area from a detection area of the camera; and
when a request event for photographing is detected, obtain the card image of the collection area by photographing with the camera.

14. The apparatus according to claim 13, wherein:
the server is further configured to return an identified character to the terminal; and
the terminal is further configured to display the identified character, and according to a payment application turned on by a user, to send the identified character to the server corresponding to the payment application.

15. The method according to claim 1, wherein:
when the card type of the card to be identified designated by the user is a bank card or an ID card, the collection area included the photographing interface is a rectangular sub-area from the detection area of the camera; and
when the card type of the card to be identified designated by the user is a circular-type card, the collection area included the photographing interface is a circular sub-area from the detection area of the camera.

* * * * *